US012355076B2

(12) United States Patent
Wang et al.

(10) Patent No.: US 12,355,076 B2
(45) Date of Patent: Jul. 8, 2025

(54) SECONDARY BATTERY, AND BATTERY MODULE, BATTERY PACK AND APPARATUS COMPRISING THE SAME

(71) Applicant: CONTEMPORARY AMPEREX TECHNOLOGY (HONG KONG) LIMITED, Hong Kong (CN)

(72) Inventors: Danfeng Wang, Ningde (CN); Chuanmiao Yan, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 171 days.

(21) Appl. No.: 17/512,103

(22) Filed: Oct. 27, 2021

(65) Prior Publication Data

US 2022/0052341 A1 Feb. 17, 2022

Related U.S. Application Data

(63) Continuation of application No. PCT/CN2020/127897, filed on Nov. 10, 2020.

(30) Foreign Application Priority Data

Dec. 4, 2019 (CN) .................. 201911230498.X (51) Int. Cl.
| | |
|---|---|
| *H01M 4/48* | (2010.01) |
| *H01M 4/131* | (2010.01) |
| *H01M 4/133* | (2010.01) |
| *H01M 4/36* | (2006.01) |
| *H01M 4/505* | (2010.01) |
| *H01M 4/525* | (2010.01) |
| *H01M 4/583* | (2010.01) |
| *H01M 4/587* | (2010.01) |
| *H01M 4/62* | (2006.01) |
| *H01M 4/64* | (2006.01) |
| *H01M 4/02* | (2006.01) |
| *H01M 10/0525* | (2010.01) |

(52) U.S. Cl.
CPC .......... *H01M 4/483* (2013.01); *H01M 4/131* (2013.01); *H01M 4/133* (2013.01); *H01M 4/364* (2013.01); *H01M 4/505* (2013.01); *H01M 4/525* (2013.01); *H01M 4/583* (2013.01); *H01M 4/587* (2013.01); *H01M 4/622* (2013.01); *H01M 4/625* (2013.01); *H01M 4/64* (2013.01); *H01M 2004/021* (2013.01); *H01M 2004/027* (2013.01); *H01M 2004/028* (2013.01); *H01M 10/0525* (2013.01)

(58) Field of Classification Search
CPC ...... H01M 4/583; H01M 4/587; H01M 4/133; H01M 4/483; H01M 4/131; H01M 4/364; H01M 4/64; H01M 4/625; H01M 4/622; H01M 4/525; H01M 10/0525; H01M 2004/021; H01M 2004/027; H01M 2004/028

See application file for complete search history.

(56) References Cited

U.S. PATENT DOCUMENTS

| | | | |
|---|---|---|---|
| 2018/0287141 | A1 | 10/2018 | Kurita et al. |
| 2019/0260020 | A1 | 8/2019 | Yamamoto et al. |
| 2019/0334162 | A1 | 10/2019 | Kurita et al. |
| 2021/0249656 | A1* | 8/2021 | Wang ............... H01M 4/133 |

FOREIGN PATENT DOCUMENTS

| | | | |
|---|---|---|---|
| CN | 107248592 | * | 10/2017 |
| CN | 107248592 A | | 10/2017 |
| CN | 107863497 | * | 3/2018 |
| CN | 107863497 A | | 3/2018 |
| CN | 107946561 | * | 4/2018 |
| CN | 107946561 A | | 4/2018 |
| CN | 109103443 A | | 12/2018 |
| CN | 109301184 A | | 2/2019 |
| CN | 109411713 A | | 3/2019 |
| CN | 109449373 A | | 3/2019 |
| CN | 109860538 A | | 6/2019 |

(Continued)

OTHER PUBLICATIONS

Tao Chen et al., "Recent advancement of SiOx based anodes for lithium-ion batteries", Journal of Power Sources, vol. 363, 2017, pp. 126-144.*

Cherkasova, A. S., and Shan, J. W. (Jun. 9, 2010). "Particle Aspect-Ratio and Agglomeration-State Effects on the Effective Thermal Conductivity of Aqueous Suspensions of Multiwalled Carbon Nanotubes." ASME. J. Heat Transfer. Aug. 2010; 132(8): 082402.*

Cheap Tubes Inc, "Application of Carbon Nanotubes", Apr. 23, 2018; https://www.azonano.com/article.aspx?ArticleID=4842.*

International Search Report dated Feb. 18, 2021 issued in PCT/CN2020/127897.

(Continued)

*Primary Examiner* — Laura Weiner (74) *Attorney, Agent, or Firm* — Scully, Scott, Murphy & Presser, P.C.

(57) ABSTRACT

The embodiments of this application provide a secondary battery, and a battery module, a battery pack and an apparatus including the same. Specifically, this application provides a secondary battery, which includes a negative electrode plate. The negative electrode plate includes a negative electrode current collector and a negative electrode film disposed on at least one surface of the negative electrode current collector. The negative electrode film includes a negative electrode active material, a conductive agent, and a binder. The negative electrode active material includes SiOx (0<x<2) and graphite. An average particle diameter Dv50 of the negative electrode active material is from 8 μm to 14 μm. The conductive agent includes carbon nanotubes whose aspect ratio is greater than or equal to 2500:1. The secondary battery can have both good rate performance and cycle performance under the premise of a relatively high energy density.

19 Claims, 2 Drawing Sheets

(56) References Cited

FOREIGN PATENT DOCUMENTS

| | | | |
|---|---|---|---|
| CN | 110148751 | A | 8/2019 |
| EP | 3333946 | A1 | 6/2018 |
| JP | 2008-224971 | * | 9/2008 |
| JP | 2016154114 | A | 8/2016 |
| KR | 20190062172 | A | 6/2019 |
| KR | 20190093174 | A | 8/2019 |
| WO | 2018117087 | A1 | 6/2018 |

OTHER PUBLICATIONS

Extended European Search Report dated May 16, 2022 received in European Patent Application No. EP 20895520.3.
Notice of Opposition dated Sep. 28, 2023 received in European Patent Application No. EP 20895520.3.
Brief Communication dated Nov. 27, 2023 received in European Patent Application No. EP 20895520.3.

* cited by examiner

SECONDARY BATTERY, AND BATTERY MODULE, BATTERY PACK AND APPARATUS COMPRISING THE SAME

CROSS-REFERENCE TO RELATED APPLICATIONS

The present application is a continuation of International Application No. PCT/CN2020/127897, filed on Nov. 10, 2020, which claims priority to Chinese Patent Application 201911230498.X, filed on Dec. 4, 2019 and entitled "SECONDARY BATTERY AND APPARATUS INCLUDING THE SECONDARY BATTERY", the entire content of which is incorporated herein by reference.

TECHNICAL FIELD

The present application relates to the field of electrochemical technologies. More specifically, the present application relates to a secondary battery, and a battery module, a battery pack and an apparatus comprising the secondary battery.

BACKGROUND

With problems such as energy crisis and environmental pollution becoming increasingly prominent, lithium-ion battery, as a new high-energy green energy storage means, is given much attention and widely used in electric or hybrid vehicles. As consumers' requirements for cruising range increase, the development of high-capacity lithium-ion batteries becomes the focus of the industry.

In order to increase the energy density of the lithium-ion battery, a positive electrode active material and a negative electrode active material with higher energy density are required. As for a negative electrode material, traditional graphite as negative electrode material is gradually unable to meet the requirements of technical development. Silicon-based material is considered to be a high specific energy negative electrode material with great potential for research and development, due to its relatively high theoretical specific capacity (more than ten times higher than the graphite) and relatively low equilibrium potential. However, in some cases, silicon-based material will cause rapid capacity decay during the process of delithiation/lithiation. In addition, the inherent electron conductivity in the silicon-based material is relatively low, which will cause relatively great polarization during the charge-discharge process, thus affecting the rate performance and cycle performance of the battery cell.

SUMMARY

One purpose of the present application is to solve problems of the stability of the electrode plate structure and the degradation of cycle performance and rate performance, caused by the expansion of the negative electrode comprising the silicon-containing negative material in the secondary battery.

To solve problems in the current technology, the first aspect of the present application is provided with a secondary battery. The secondary battery comprises a negative electrode plate, which comprises a negative electrode current collector and a negative electrode film disposed on at least one surface of the negative electrode current collector. And the negative electrode film comprises a negative electrode active material, a conductive agent, and a binder. The negative electrode active material comprises $SiO_x$ (0<x<2) and graphite. An average particle diameter Dv50 of the negative electrode active material is from 8 μm to 14 μm. The conductive agent comprises carbon nanotubes whose aspect ratio is greater than or equal to 2500:1.

The negative electrode plate of the secondary battery in the present application is provided with a silicon-containing material with a specific size as the negative electrode active material, and carbon nanotubes with a specific aspect ratio as the conductive agent. And under their joint action, the battery can have both good cycle performance and rate performance under the premise of a relatively high energy density.

In some exemplary embodiments, an average particle diameter Dv50 of the $SiO_x$ (0<x<2) is from 3 μm to 10 μm, optionally, from 5 μm to 8 μm.

In silicon system, the matching of particle diameters of the silicon and the graphite mainly affects the cycle performance of the battery. Adjusting and controlling the $SiO_x$ in accordance with the above specific particle diameter can effectively improve the cycle performance of the battery.

In some exemplary embodiments, an average particle diameter Dv50 of the graphite is from 10 μm to 20 μm, optionally, from 13 μm to 18 μm.

In silicon system, the matching of particle diameters of the silicon and the graphite mainly affects the cycle performance of the battery. Adjusting and controlling the graphite in accordance with the above specific particle diameter can effectively improve the cycle performance of the battery.

In some exemplary embodiments, the carbon nanotubes are a single-walled carbon nanotubes (SWCNTs).

Single-walled carbon nanotubes have excellent electrical conductivity and mechanical properties. Doping a small amount of single-walled carbon nanotubes with the specific high aspect ratio in the secondary battery can greatly improve the structural stability of the negative electrode plate while forming a powerful and stable conductive network, reduce the proportion of an inactive material in the negative electrode plate, and prevent situations in the battery cell such as the active material peeling off from the surface of the current collector and the conductive path being blocked due to the huge volume expansion of the silicon material during the cycle process, and then avoid the rapid decay of the battery cell capacity, i.e. performance dive, thereby improving its cycle performance.

In some exemplary embodiments, the aspect ratio of the carbon nanotubes is from (2500:1) to (20000:1), optionally, from (2800:1) to (10000:1).

Taking into account the processability of the carbon nanotubes in the preparation process of the electrode plate, the selection of the above specific aspect ratio of the carbon nanotubes makes the carbon nanotubes have both relatively good electric properties and processability.

In some exemplary embodiments, a mass proportion of the carbon nanotubes in the negative electrode film is less than or equal to 1%, optionally, from 0.3% to 0.6%.

Taking into account the energy density of the battery, the selection of the above specific mass proportion of the carbon nanotubes in the negative electrode film can better meet the requirements for the energy density of the battery.

In some exemplary embodiments, the binder comprises one or more of polyacrylate; optionally, the binder comprises sodium polyacrylate.

Polyacrylate binders can effectively ensure the integral connectivity between the active material, the conductive agent and the current collector. Where, the sodium polyacrylate can not only form a strong hydrogen bond with the silicon-based material, but form a relatively uniform coating film on the surface of the material, which can alleviate the volume change of the silicon-based material and enhance the mechanical properties and processability of the electrode plate, to meet the requirements in actual production.

In some exemplary embodiments, a weight content of the binder in the negative electrode film is from 3% to 9%, optionally, from 4% to 6%.

Under the condition that the binder is selected from the above range, the adhesion can be ensured in a proper range (10~90 N/m), to ensure that the active material does not fall off the surface of the current collector during cycling; in the meantime, the reduction of the proportion of the inactive material can effectively increase the energy density of the battery cell, thereby improving the structural stability of the electrode plate and the cycle performance of the battery cell.

In some exemplary embodiments, a mass percentage content W of the SiOx (0<x<2) in the negative electrode active material is 15%≤W≤40%, optionally, 20%≤W≤40%.

The negative electrode active material with a suitable content of the SiOx can better meet the requirements of the electrical properties of the negative electrode plate.

In some exemplary embodiments, the graphite is selected from one or more of artificial graphite and natural graphite.

Artificial graphite and natural graphite can better meet the requirements of usability.

In some exemplary embodiments, a thickness of the negative electrode current collector is from 4 μm to 10 μm, optionally, from 4 μm to 8 μm.

The negative electrode current collector with a proper thickness can better meet the requirements of the negative electrode current collector in terms of the electrical and mechanical properties.

In some exemplary embodiments, a range of surface roughness Ra of the negative electrode current collector is 1.6 μm≤Ra≤3.2 μm.

The surface roughness of the current collector directly affects the magnitude of the adhesion between the current collector and the active material. And the adhesion of the negative electrode plate can be improved by increasing the surface roughness of the current collector. However, the surface of the current collector is susceptible to corrosion by the electrolyte if the roughness of the surface is too great. The surface roughness of the current collector is selected according to the above specific standards, which can effectively avoid the corrosion of the electrolyte caused by the excessive roughness while improving the adhesion of the negative electrode plate.

In some exemplary embodiments, an adhesion F between the negative electrode film and the negative electrode current collector is 10 N/m≤F≤90 N/m, optionally, 30 N/m≤F≤80 N/m.

The suitable adhesion between the negative electrode film and the negative electrode current collector ensures that the active material does not fall off the surface of the current collector during cycling.

In some exemplary embodiments, a compacted density PD of the negative electrode film is 1.6 g/cm³≤PD≤2.0 g/cm³, optionally, 1.65 g/cm³≤PD≤1.8 g/cm³.

The compacted density of the negative electrode film is a parameter that affects the electrical and mechanical properties of the negative electrode film. The compacted density of the negative electrode film is selected in accordance with the above specific range, which can better meet the requirements of the negative electrode film in terms of the electrical and mechanical properties.

In some exemplary embodiments, a coating weight CW of the negative electrode film is 0.045 mg/mm²≤CW≤0.09 mg/mm², optionally, 0.06 mg/mm²≤CW≤0.08 mg/mm².

The coating weight of the negative electrode film is a parameter that affects the electrical and mechanical properties of the negative electrode film. The coating weight of the negative electrode film is selected in accordance with the above specific range respectively, which can better meet the requirements of the negative electrode film in terms of the electrical and mechanical properties.

In some exemplary embodiments, the secondary battery further comprises a positive electrode plate. The positive electrode plate comprises a positive electrode current collector and a positive electrode film disposed on at least one surface of the positive electrode current collector and comprising a positive electrode active material. The positive electrode active material comprises $Li_{1+y}Ni_aCo_bM_cO_{2-z}A_z$, where −0.2≤y≤0.2, 0.5≤a<1, 0<b≤0.3, 0<c≤0.2, 0≤z<0.2, and M is selected from one or more of Mn and Al, and A is selected from one or more of S, N, F, Cl, Br and I.

The energy density of the positive electrode active material selected above is relatively high, which can better match the negative electrode active material with high energy density.

In the second aspect of the present application, a battery module is provided, which comprises the secondary battery in the first aspect.

In the third aspect of the present application, a battery pack is provided, which comprises the battery module in the second aspect.

In the fourth aspect of the present application, an apparatus is provided, which comprises the secondary battery in the first aspect. The above secondary battery is used as a power source or a power storage unit of the apparatus.

The battery module, the battery pack, and the apparatus in the present application include the secondary battery, and therefore have at least the same or similar technical effect as the above secondary battery.

BRIEF DESCRIPTION OF FIGURES

To describe the technical solutions in the embodiments of the present application more clearly, the accompanying drawings required for the embodiments are briefly described as following. Apparently, the accompanying drawings in the following description show merely some embodiments of the present application, and persons of ordinary skill in the field may still derive other drawings from these accompanying drawings without creative efforts.

SIGNS DESCRIPTION

1 Battery pack; 2 Upper box; 3 Lower box; 4 Battery module; and 5 Secondary battery.

DETAILED DESCRIPTION

Implementation manners of the present application will be further described below in detail with reference to the accompanying drawings and embodiments. The detailed description of the following embodiments and the accompanying drawings are used to exemplarily illustrate principles of the present application, but cannot be used to limit the scope of the present application, that is, the present application is not limited to the described embodiments.

For brevity, the present application specifically discloses only some numerical ranges. However, any lower limit may be combined with any upper limit to form an unspecified range, any lower limit may be combined with another lower limit to form an unspecified range, and likewise, any upper limit may be combined with any other upper limit to form an unspecified range. In addition, each individually disclosed point or single numerical value, as a lower limit or an upper limit, may be combined with any other point or single numerical value or combined with another lower limit or upper limit to form an unspecified range.

In descriptions of the present application, it should be noted that, unless otherwise specified, "more than" or "less than" comprises all numbers within that range including the endpoints, and "more" in "one or more" means two or more than two.

Unless otherwise specified, terms used in this application have well-known meanings generally understood by a person skilled in the field. Unless otherwise specified, numerical values of parameters mentioned in the present application may be measured by using various measurement methods commonly used in the field (for example, testing may be performed according to a method provided in an embodiment of the present application).

In the first aspect of the present application, an embodiment of the present application is provided with a secondary battery. The secondary battery comprises a negative electrode plate, which comprises a negative electrode current collector and a negative electrode film disposed on at least one surface of the negative electrode current collector. The negative electrode film comprises a negative electrode active material, a conductive agent and a binder. The negative electrode active material comprises SiOx (0<x<2) and graphite. An average particle diameter Dv50 of the negative electrode active material is 8 micrometer (μm) to 14 μm. The conductive agent comprises carbon nanotubes whose aspect ratio is greater than or equal to 2500:1.

Studies have found that, in some cases, the silicon-based material will undergo a huge volume change during the process of delithiation/lithiation, causing the electrode plate to pulverize and peel off, which in turn leads to rapid capacity decay.

The negative electrode plate of the secondary battery provided by the embodiment of the present application adopts a negative electrode active material mixed with SiOx (0<x<2) and graphite, so that a high energy density is ensured as well as an excessive volume expansion of the pure silicon-based material is avoided.

In addition, the negative electrode plate also uses carbon nanotubes with a high aspect ratio (≥2500:1) as the conductive agent, while the particle diameters of the SiOx (0<x<2) and the graphite match each other. In silicon system, the matching of particle diameters of the silicon and the graphite mainly affects the cycle performance of the battery, thus the cycle performance can be effectively improved by controlling the particle diameter in a range of from 8 μm to 14 μm. The reason is that the volume of the silicon material changes greatly during the charge-discharge cycle process. Under the condition that the matching of the particle diameters of silicon and graphite is not controlled, the volume of the silicon material expands and squeezes the electrolyte in the graphite during the charge process, and the volume shrinkage of the silicon material causes the size of the pore of the electrode plate to expand and easily results in an untimely electrolyte reflux during the discharge process, all of which will cause the transmission channel of lithium-ions to be blocked, thereby affecting the cycle performance of the battery. However, the silicon and graphite materials that the particle diameters match have relatively large specific surface area, thus the total amount of the binder needed to consume will increase. The relatively large proportion of the inactive material will not only increase the production cost of the battery cell, but reduce their weight energy density. Controlling the aspect ratio of the carbon nanotubes (CNT for short) in a range of greater than or equal to 2500:1, can reduce the content of the binder under the premise of ensuing the adhesion in a proper range (10 Newton/meter (N/M)≤F≤90 N/m), thereby alleviating the problem. Therefore, controlling the average particle diameter Dv50 of the negative electrode active material in a range of from 8 μm to 14 μm and using the carbon nanotubes with an aspect ratio greater than or equal to 2500:1 as the conductive agent, can make the battery have both the cycle performance and the energy density.

In the negative electrode plate of the secondary battery provided by the embodiment of the present application, carbon nanotubes with a high aspect ratio (≥2500:1) are adopted. Due to its excellent electrical conductivity, thermal conductivity and structural stability, CNT is often added to the electrode plate of lithium-ion battery to build a stable conductive network, to maintain the complete conduction of electrons during the cycle, to increase the transmission rate of Lit, and to reduce the resistance of the electrode plate while reducing polarity, thereby improving the rate performance and the cycle performance of the battery cell. In addition, the CNT network also has a certain porosity and a relatively large specific surface area, which can ensure that the electrolyte is in full contact with the active material and undergo electrochemical reactions. In addition, due to the high structural stability of CNT, its flexibility can effectively buffer the problems such as pulverization and peeling of the electrode plate caused by a mechanical stress, which is caused by the huge volume change of the silicon-based material during the cycling of battery. Therefore, in the negative electrode plate of the secondary battery provided by the embodiment of the present application, CNT can construct a stable conductive network and enhance the structural stability of the electrode plate, which can not only reduce the growth of the direct current impedance (DCR for short) of the battery cell during the cycle, but avoid rapid capacity decay in the early stages of the cycle. CNT with a high aspect ratio (≥2500:1) can establish more cross-linking points in the active material, thereby providing more conductive paths, slowing down the DCR growth and polarization of the negative electrode, improving the rate performance. Furthermore, the conductive network can maintain good stability during the charge-discharge cycle process, effectively improving the cycle performance of the battery cell. At the same time, the use of selected carbon nanotubes allows the weight content of the binder to be properly reduced (from 3% to 9%), and reducing the proportion of inactive material can effectively increase the energy density of the battery cell. In addition, the use of selected carbon nanotubes and selected content of the binder can ensure that the adhesion is within the proper range (from 10 to 90 N/m), and ensure that the active material does not fall off the surface of the current collector during cycling, thereby improving the structural stability of the electrode plate and the cycle performance of the battery cell. In summary, the battery cell manufactured with the selected negative electrode plate can simultaneously have relatively good rate performance, relatively high energy density and relatively good cycle performance.

Taking into account the processability of the carbon nanotubes during the preparation of the electrode plate, the range of the aspect ratio of the carbon nanotubes can be optional from (2500:1) to (20000:1), and further optional from (2800:1) to (10000:1), for example, 2500:1, 2800:1, 4000:1, 6000:1, 10000:1, 15000:1, or 20000:1. Optionally, the carbon nanotubes can be single-walled carbon nanotubes (SWCNTs for short). Single-walled carbon nanotubes have excellent electrical conductivity and mechanical properties. Doping a small amount of carbon nanotubes with optional high aspect ratio into the negative electrode material can greatly improve the structural stability of the negative electrode plate and form a strong and stable conductive network, which reduces the proportion of the inactive materials in the negative electrode plate, and prevents the active material from peeling off the surface of the current collector and blocking the conductive path, due to the huge volume expansion of the silicon material during the cycle process, so as to avoid the rapid capacity decay, i.e. performance dive, thereby improving its cycle performance.

Taking into account the energy density of the battery, optionally, the mass ratio of the carbon nanotubes in the entire negative electrode film is less than or equal to 1%, and further optional is from 0.3% to 0.6%, such as 0.3%, 0.4%, 0.5% or 0.6%.

The conductive agent comprises carbon nanotubes, and may also comprise other conventional conductive agents, such as conductive carbon materials like acetylene black.

The binder is an inactive component in an electrode plate of a lithium-ion battery whose main function is to ensure the overall connectivity between the active material, the conductive agent and the current collector. Various binders commonly used in the field of lithium-ion batteries (such as Styrene-butadiene rubber, SBR for short, etc.) can be used. But optionally, the binder provided in the present application comprises a polyacrylate binder, in particular, a polyacrylate. And further optionally, sodium polyacrylate is used as the binder for the negative electrode plate. Sodium polyacrylate can not only form a strong hydrogen bond with the silicon-based material, but form a relatively uniform coating film on the surface of the material, which can alleviate the volume change of the silicon-based material and enhance the mechanical properties and processability of the electrode plate, to meet the requirements in actual production.

Optionally, the weight content x of the binder in the negative electrode film is $3\% \leq x \leq 9\%$, further optionally, $4\% \leq x \leq 6\%$, for example, 3%, 4%, 4.5%, 5%, 5.5%, 6%, 7%, 8% or 9%.

The use of optional binders (such as sodium polyacrylate) can reduce the weight content of the binder to a range of from 3% to 9%, while maintaining the adhesion in the range of 10 N/m~90 N/m. That is to say, the use of optional binders can reduce the proportion of the inactive material in the negative electrode plate, thereby effectively increasing the energy density of the battery cell. In the prior art, the weight content of the binder generally needs to be from 10% to 20% to maintain the adhesion between the active material and the surface of the current collector within a proper range.

The adhesion defined herein is the force required to make the active material to peel off from the substrate in a unit width, and is used to characterize the degree of bonding between the active material and the substrate. Under the condition of that the adhesion is too small, the active material may fall off the substrate during long-term cycle.

The negative electrode active material used in the negative electrode film is a mixture of the silicon-based material and the graphite, which may additionally contain other negative electrode active materials commonly used in the field. The silicon-based material is SiOx (0<x<2), for example, SiO. Graphite may be one or more selected from artificial graphite and natural graphite. The average particle diameter Dv50 of the negative electrode active material is from 8 μm to 14 μm, for example, from about 8 μm, 9 μm, 10 μm to about 13 μm, 14 μm. The average particle diameter Dv50 of the graphite may be from 10 μm to 20 μm, or optionally, from 13 μm to 18 μm, for example, 10 μm, 11 μm, 13 μm, 15 μm, 18 μm, or 20 μm. The average particle diameter Dv50 of the SiOx (0<x<2) may be from 3 μm to 10 μm, optionally, from 5 μm to 8 μm, for example, 3 μm, 4 μm, 5 μm, 6 μm, 8 μm, 9 μm, or 10 μm. In some alternative embodiments, the silicon-based material may comprise a silicon-based material and another silicon-based material, and the particle diameter Dv50 of these two silicon-based material is different from each other.

In the negative electrode active material, the mass percentage content W of the SiOx (0<x<2) is optionally: $15\% \leq W \leq 40\%$, more optionally, $20\% \leq W \leq 40\%$. For example, W can be from 15%, 16%, 17%, 18%, 19%, 20%, 21% or 22%, to 25%, 26%, 27%, 28%, 29%, 30%, 31%, 32%, 33%, 34%, 35%, 36%, 37%, 38%, 39% or 40%.

A metal foil or a porous metal plate may be used as the negative electrode current collector. The material of the negative electrode current collector may be a metal conductive material selected from copper, nickel, titanium, silver, nickel-copper alloy, aluminium-zirconium alloy, etc., or a polymer composite current collector coated with a metal conductor coating may also be adopted. Copper foil or copper-coated polymer composite current collector may be adopted as the negative electrode current collector. Optionally, the thickness of the negative electrode current collector is from 4 μm to 10 μm, further optionally, from 4 μm to 8 μm, such as 4 μm, 5 μm, 5.5 μm, 6 μm, 6.5 μm, 7 μm, 7.5 μm, 8 μm, 9 μm, or 10 μm. Optionally, the range of the roughness Ra of the copper foil is 1.6 μm≤Ra≤3.2 μm, because the roughness of the surface of the current collector directly affects the adhesion between the current collector and the active material. And the adhesion of the negative electrode plate can be improved by increasing the surface roughness of the current collector. However, the surface of the current collector is susceptible to corrosion by the electrolyte when the roughness of the surface is too great. Therefore, optionally, the range of the surface roughness Ra of the negative electrode current collector is 1.6 μm≤Ra≤3.2 μm. And Ra is, for example, 1.6 μm, 1.8 μm, 2.0 μm, 2.2 μm, 2.4 μm, 2.6 μm, 2.8 μm, 3 μm, or 3.2 μm, which is easy to ensure that the adhesion is in the range of from 10 N/m to 90 N/m, and can be further selected in the range of from 30 N/m to 80 N/m. And the adhesion is, for example, 10 N/m, 30 N/m, 40 N/m, 50 N/m, 60 N/m, 70 N/m, 80 N/m, or 90 N/m.

The negative electrode plate in the secondary battery of the embodiment of the present application may be prepared by using methods that are commonly known in the field. Usually, the negative electrode active material as well as the conductive agent, the binder and other optional additives are mixed together and dispersed in a solvent (e.g. deionized water) followed by stirring well and then evenly coating onto the negative electrode current collector. The negative electrode plate containing the negative electrode film is obtained after post-processing, such as drying and cold pressing.

In some optional embodiments, the compaction density PD of the negative electrode film is in a range of 1.6 grams per cubic centimeter (g/cm$^3$)≤PD≤2.0 g/cm$^3$, and further optionally 1.65 g/cm$^3$≤PD≤1.8 g/cm$^3$. The compaction density PD is, for example, 1.6 g/cm$^3$, 1.65 g/cm$^3$, 1.7 g/cm$^3$, 1.75 g/cm$^3$, 1.8 g/cm$^3$, 1.9 g/cm$^3$, or 2.0 g/cm$^3$.

In some optional embodiments, the coating weight CW of the negative electrode film is 0.045 milligrams per square millimeter (mg/mm$^2$)≤CW≤0.09 mg/mm$^2$, optionally, 0.06 mg/mm$^2$≤CW≤0.08 mg/mm$^2$. The coating weight CW is, for example, 0.045 mg/mm$^2$, 0.05 mg/mm$^2$, 0.06 mg/mm$^2$, 0.065 mg/mm$^2$, 0.07 mg/mm$^2$, 0.075 mg/mm$^2$, 0.08 mg/mm$^2$ or 0.09 mg/mm$^2$.

It is worth noting that when preparing the negative electrode plate, the current collector may be coated on both sides or on one side.

It should be noted that parameters of the negative electrode film that are provided in the present application all indicate a parameter ranges of electrode film on a single surface. When the negative electrode film is provided on both surfaces of the current collector, parameters of the electrode film on either surface are considered to fall within the scope of protection of the present application under the condition that they satisfy the implementation manners of the present application. In addition, the range of compacted densities and surface densities of the electrode films in implementation manners of the present application refers to the range of parameters that are compacted by cold pressing and used to assemble the battery.

The secondary battery provided by the embodiments of the present application can be manufactured according to known methods. For example, the secondary battery may be manufactured according to the following methods.

Firstly, the positive electrode plate of the battery is prepared according to a conventional method in the field. The positive electrode active material used for the positive electrode plate is not limited in embodiments of the present application. Usually, a conductive agent (for example, a carbon material such as carbon black), and/or a bonding agent (for example, Poly (vinylidene fluoride), PVDF for short), and the like need to be added to the foregoing positive electrode active material. Other additives such as positive temperature coefficient (PTC for short) thermistor material may also be added according to actual needs. Usually, the positive electrode plate is obtained by mixing and dispersing these materials in a solvent (for example, N-methyl-2-pyrrolidone, NMP for short), evenly stirring them, uniformly applying them onto the positive current collector, and drying the positive current collector. A metal foil such as an aluminium foil or a porous metal plate may be used as the positive current collector. Optionally, aluminium foil may be used.

Then, the battery negative electrode plate is prepared as described above.

Finally, the positive electrode plate, the separator, and the negative electrode plate are laminated in order, so that the separator is placed between the positive and negative electrode plates as a means of isolation. And then perform winding to obtain a bare battery cell, which is placed in an outer package housing. The secondary battery is obtained after drying, injecting the electrolyte, vacuum packaging, standing, forming, shaping, etc.

Various conventional materials in the field can be selected for components of the secondary battery (positive electrode plate, electrolyte, separator, etc.).

The positive electrode of the secondary battery provided in the embodiments of the present application comprises a positive current collector and a positive electrode film disposed on at least one surface of the positive current collector and comprising an electrode active material. In the present application, the positive electrode active material may be optionally one or more of lithium cobalt oxide, lithium nickel oxide, lithium manganese oxide, lithium nickel manganese oxide, lithium nickel cobalt manganese oxide, lithium nickel cobalt aluminium oxide and lithium-containing phosphates of olivine structure. However, these materials are not limited in the embodiments of the present application and other conventionally known materials that may be used as positive electrode active materials for lithium-ion batteries may also be used. One type of these positive electrode active materials may be used alone, or two or more types may be used in combination. Optionally, the positive electrode active material can be optionally one or more of LiCoO$_2$, LiNiO$_2$, LiMnO$_2$, LiMn$_2$O$_4$, LiNi$_{1/3}$Co$_{1/3}$Mn$_{1/3}$O$_2$ (NCM333), LiNi$_{0.5}$Co$_{0.2}$Mn$_{0.3}$O$_2$ (NCM523), LiNi$_{0.6}$Co$_{0.2}$Mn$_{0.2}$O$_2$ (NCM622), LiNi$_{0.8}$Co$_{0.1}$Mn$_{0.02}$ (NCM811), LiNi$_{0.85}$Co$_{0.15}$AlO$_2$, LiFePO$_4$ (LFP), and LiMnPO$_4$. Further optionally, the positive electrode active material includes Li$_{1+y}$Ni$_a$Co$_b$M$_c$O$_{2-z}$A$_z$, where, −0.2≤y≤0.2, 0.5≤a<1, 0<b≤0.3, 0<c≤0.2, 0≤z<0.2, M is optionally one or more of Mn and Al, and A is selected from one or more of S, N, F, Cl, Br and I. Duo to a relatively high energy density, the positive electrode active material can be better matched to the negative electrode active material with high energy density. The positive electrode film usually also comprises conductive agents (such as acetylene black, etc.), binders (such as PVDF, etc.) and other optional additives (such as PTC thermistor materials, etc.). The positive collector may be a metallic conductive material selected from aluminium, copper, nickel, titanium, silver, nickel-copper alloy or aluminium-zirconium alloy, or a polymer composite current collector coated with a metallic conductor coating may also be used; optionally aluminium or a polymer composite collector coated with aluminium may be used.

In the secondary battery provided by the embodiments of the present application, the separator is disposed between the positive electrode plate and the negative electrode plate, to function as an isolation. Where the type of the separator is not specifically limited, and the separator may be, but is not limited to, any separator material used in existing batteries, for example, polyethylene, polypropylene, polyvinylidene fluoride, and a multilayer composite electrode film thereof.

In the secondary battery provided in the embodiments of the present application, the type of electrolyte is not specifically limited. The electrolyte may comprises an electrolyte salt and an organic solvent. And types of the electrolyte salt and the organic solvent are not specifically limited, and may be selected according to actual needs. For example, as a non-aqueous electrolyte, a lithium salt solution dissolved in an organic solvent is generally used. The lithium salt is, for example, an inorganic lithium salt such as $LiCiO_4$, $LiPF_6$, $LiBF_4$, $LiAsF_6$ or $LiSbF_6$, or an organic lithium salt such as $LiCF_3SO_3$, $LiCF_3CO_2$, $Li_2C_2F_4(SO_3)_2$, $LiN(CF_3SO_2)_2$, $LiC(CF_3SO_2)_3$ or $LiC_nF_{2n+1}SO_3$ (n≥2), etc. Organic solvents used in non-aqueous electrolytes are cyclic carbonates such as vinyl carbonate, propylene carbonate, butylene carbonate or vinylidene carbonate; chain carbonates such as dimethyl carbonate, diethyl carbonate or methyl ethyl carbonate; chain esters such as methyl propionate, cyclic esters such as gamma-butyrolactone; chain ethers such as dimethoxyethane, diethyl ether, diethylene glycol dimethyl ether or triethylene glycol dimethyl ether; cyclic ethers such as tetrahydrofuran or 2-methyl cyclic ethers such as tetrahydrofuran or 2-methyltetrahydrofuran, nitrile such as acetonitrile or propanenitrile, or mixtures of these solvents. The electrolyte may further comprise an additive whose type is not particularly limited either. And the additive may be a negative electrode film-forming additive, a positive electrode film-forming additive, or an additive that can improve specific performance of the battery, for example, an additive for improving overcharge performance of the battery, an additive for improving high-temperature performance of the battery, or an additive for improving low-temperature performance of the battery. Optionally, the additive comprises a fluoroethylene carbonate (FEC for short) solvent.

Unless otherwise specified, the various parameters involved in the present specification have the meanings known in the field and can be measured according to methods known in the field. For example, tests can be carried out according to the methods provided in the embodiments of the present application.

Compared with the traditional secondary battery, the embodiments of the present application can effectively improve the cycle performance and rate performance of the battery under the premise of that the secondary battery have high energy density. Therefore, it is of great significance to the field of new energy vehicles and the like.

In some embodiments, the secondary battery may comprise an outer package for encapsulating the positive electrode plate, the negative electrode plate, the separator, and the electrolyte. In an example, the positive electrode plate, the negative electrode plate, and the separator may be laminated or wound to form a laminated structure battery cell or a wound structure battery cell, which is encapsulated in an outer package. And the electrolyte is infiltrated in the battery cell. There may be one or more battery cells in the secondary battery, and their quantity may be adjusted as required.

In some embodiments, the outer package of the secondary battery may be a soft package, for example, a soft bag. A material of the soft package may be plastic, for example, may comprise one or more of polypropylene (PP for short), polybutylene terephthalate (PBT for short), polybutylene succinate (PBS for short), and the like. The outer package of the secondary battery may be a hard shell, for example, an aluminium shell.

Figure 1:
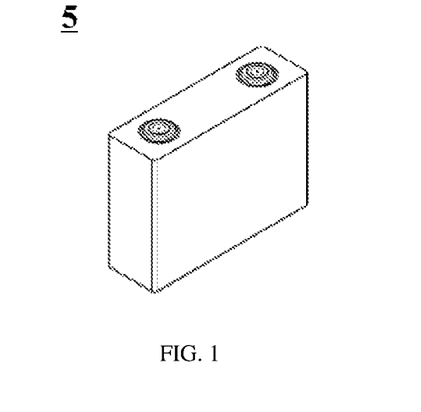
FIG. 1 is a schematic diagram of an embodiment of a secondary battery in the present application.

The shape of the secondary battery is not particularly limited in the present application, and the secondary battery may be of a cylindrical, square, or any other shape. FIG. 1 shows a secondary battery 5 of a square structure as an example.

In the second aspect of the present application, the secondary battery may be assembled into a battery module, and the battery module may comprise a plurality of secondary batteries, and the specific quantity may be adjusted based on application and capacity of the battery module.

Figure 2:
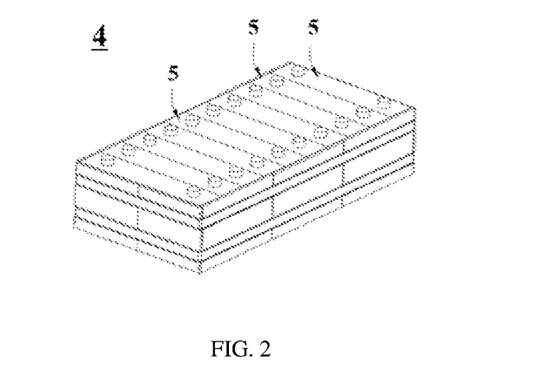
FIG. 2 is a schematic diagram of an embodiment of a battery module.

FIG. 2 shows a battery module 4 as an example. Referring to FIG. 2, in the battery module 4, a plurality of secondary batteries 5 may be sequentially arranged along a length direction of the battery module 4. Certainly, it may be arranged in accordance with any other manner. In some exemplary embodiments, a plurality of secondary batteries 5 may be fixed by fasteners.

In some embodiments, the battery module 4 may further comprise a housing with an accommodating space, and a plurality of secondary batteries 5 are accommodated in the accommodating space.

In the third aspect of the present application, the above battery module provided in the second aspect may be further assembled into a battery pack, and a quantity of battery modules included in the battery pack may be adjusted based on application and capacity of the battery pack.

Figure 3:
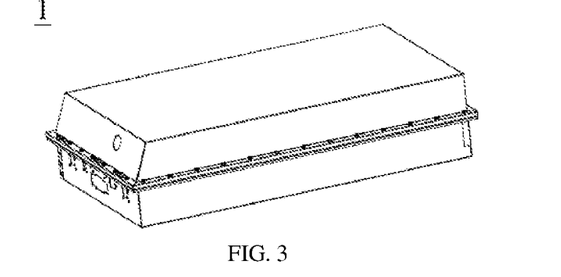
FIG. 3 is a schematic diagram of an embodiment of a battery pack.
Figure 4:
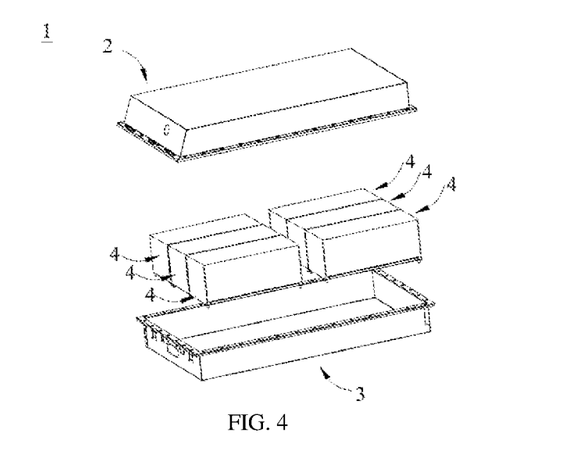
FIG. 4 is an exploded diagram of FIG. 3.

FIG. 3 and FIG. 4 show a battery pack 1 as an example. Referring to FIG. 3 and FIG. 4, the battery pack 1 may comprise a battery box and a plurality of battery modules 4 disposed in the battery box. The battery box comprises an upper box 2 and a lower box 3. The upper box 2 can cover the lower box 3 and form an enclosed space for accommodating the battery modules 4. A plurality of battery modules 4 may be arranged in the battery box in any manner.

In the fourth aspect of the present application, an apparatus is provided, which comprises the secondary battery in the first aspect, and the secondary battery supplies power to the apparatus. The apparatus may be, but is not limited to, a mobile device (such as a mobile phone, a laptop, etc.), an electric vehicle (such as a pure electric vehicle, a hybrid electric vehicle, a plug-in hybrid electric vehicle, an electric bicycle, an electric scooter, an electric golf cart, an electric truck, etc.), an electric train, a ship and satellite, an energy storage system, etc.

A secondary battery (Cell), a battery module (Module), or a battery pack (Pack) may be selected for the apparatus according to requirements for using the apparatus.

Figure 5:
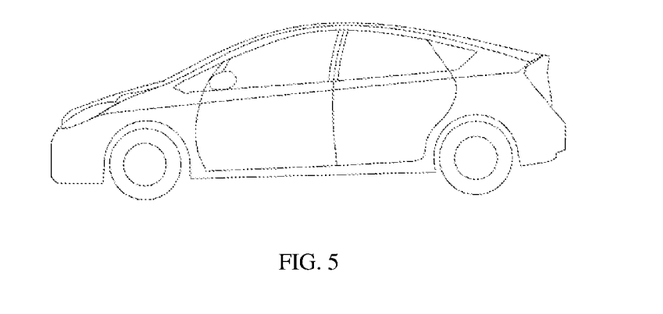
FIG. 5 is a schematic diagram of an embodiment of an apparatus using the secondary battery in the present application as a power source.

FIG. 5 shows an apparatus as an example. The apparatus is a full electric vehicle, a hybrid electric vehicle, a plug-in hybrid electric vehicle, or the like. To meet a requirement of the apparatus for high power and a high energy density of a secondary battery, a battery pack or a battery module may be used.

In another example, the apparatus may be a mobile phone, a tablet computer, a laptop, or the like. The apparatus usually requires to be light and thin, and a secondary battery may be used as a power source.

Beneficial effects of this application are further described below with reference to embodiments.

EMBODIMENTS

To make the application objectives, technical solutions, and beneficial technical effects of the present application clearer, the present application is further described below in detail with reference to the embodiments. However, it should be understood that the embodiments of the present application are merely intended to explain the present application, but not to limit the present application, and the embodiments of the present application are not limited to the embodiments given in this specification. In embodiments in which specific experimental conditions or operating conditions are not specified, preparation is performed according to conventional conditions or according to conditions recommended by a material supplier.

I. Preparation of a Battery for a Test

Batteries in the embodiments and the comparative examples are all prepared and tested according to the following method.

(1) Preparation of a Positive Electrode Plate

A NCM811 as positive electrode active material, an acetylene black as conductive agent, and a PVDF as binder are mixed in a mass ratio of 98:2:2. Adding a solvent NMP and stirring under the action of a vacuum mixer until the system is uniform to obtain positive electrode slurry. And the positive electrode slurry is uniformly coated on a positive electrode current collector aluminium foil (coated on both sides) and transferred to an oven after being dried at a room temperature. And then the positive electrode plate is obtain after cold compression, slitting and cutting. The compaction density PD of the positive electrode film is 3.5 g/cm$^3$, and the single-sided coating weight CW is 0.192 mg/mm$^2$.

(2) Preparation of a Negative Electrode Plate

The SiOx (0<x<2) as the first negative electrode active material, the graphite as the second negative electrode active material, the conductive agent (acetylene black and carbon nanotubes), and the binder (sodium polyacrylate or polyacrylamide) are mixed in a certain mass ratio (see Table 1). Adding a deionized water as solvent and stirring under the action of a vacuum mixer until the system is uniform to obtain negative electrode slurry. And the negative electrode slurry is uniformly coated on a negative electrode current collector copper foil (coated on both sides) and transferred to an oven after being dried at a room temperature. And then the negative electrode plate is obtain after cold compression, slitting and cutting. The compaction density PD of the negative electrode film is 1.7 g/cm$^3$, and the single-sided coating weight CW is 0.074 mg/mm$^2$.

(3) Preparation of an Electrolyte

Mixing ethylene carbonate (EC for short), ethyl methyl carbonate (EMC for short), and diethyl carbonate (DEC for short) in accordance with a volume ratio of 1:1:1 to obtain an organic solvent. And then dissolving a fully dried lithium salt LiPF6 in the mixed organic solvent, to prepare an electrolyte with a concentration of 1 mole per litre (mol/L). And adding the FEC as additive to the electrolyte with 8% by mass of the additive FEC in the electrolyte.

(4) Separator

A polyethylene electrode film is used as the separator.

(5) Preparation of the Lithium-Ion Battery

Laminating the positive electrode plate, the separator, and the negative electrode plate in order, so that the separator is placed between the positive and negative electrode plates as a means of isolation. And then winding to obtain a bare battery cell, which is placed in an outer package with a Short Safety Device (SSD) followed by drying and injecting the electrolyte. The lithium-ion battery is obtained after steps such as vacuum packaging, standing, forming, and shaping. The size of the housing of the lithium-ion battery in length*width*height=28.5 mm*148 mm*97.5 mm.

II. Test for Performance Parameters

1. Test for adhesion: the negative electrode plate prepared in the embodiment was vacuum dried for 12 hours and then glued to a stainless steel plate, and then one end of the negative electrode plate was pulled through a tension machine. The speed of the tension machine was adjusted to be fixed at 50 mm per minute (mm/min) and the displacement is set to 40 millimeters (mm). After the instrument is stable, the tensile force separating the active material from the substrate per unit width is the adhesion (in N/m).

2. Cycle performance test: the lithium-ion battery prepared by the embodiments was performed charge/discharge test on a Neware tester at a rate of 1C/1C with a voltage range of 2.5 to 4.25 volts (V) at 25 degrees Celsius (° C.) until the capacity of the lithium-ion battery was less than 80% of the initial capacity, and the cycle number of the lithium-ion battery was recorded to characterize the cycle performance of the battery cell, in cycle.

3. Energy density test: the lithium-ion battery prepared by the embodiments was performed charge/discharge test on a Neware tester with a rate of 1C/1C with a voltage range of 2.5~4.25V at 25° C., and the energy released by the battery cell during initial charge and discharge process is recorded, which is divided by the weight of the battery cell to obtain the weight energy density of the battery cell, in watt-hour per kilogram (Wh/kg).

4. Rate performance test: the lithium-ion battery prepared in the embodiments was performed charge/discharge cycle on a Neware tester at a rate of 0.33C/0.33C, 0.5C/0.33C, 1C/0.33C, 2C/0.33C, with a voltage range always maintained in 2.5~4.25V at 25° C., and the ratio of the 2C/0.33C cycle discharge capacity to the 0.33C/0.33C initial cycle discharge capacity is recorded as the capacity retention rate, i.e. the rate performance of the battery cell.

5. Average Particle Diameter of the Negative Electrode Active Material

The average particle diameter Dv50 of the negative electrode active material can be measured using a laser diffraction particle diameter distribution measuring instrument (Mastersizer 3000). Specifically, particle diameter distribution may be measured by according to a laser diffraction particle diameter distribution method (for details, refer to GB/T 19077-2016), and a median Dv50 of volume distribution is used to represent an average particle diameter. The Dv50 of the first negative electrode active material, the Dv50 of the second negative electrode active material, and the total average particle diameter Dv50 of the negative electrode active material are measured separately.

III. Test Results of Embodiments and Comparative Examples

Batteries for the embodiments and the comparative examples are prepared according to the foregoing method, and performance parameters are measured. Results are shown in the following Table 1 and Table 2.

TABLE 1

The battery composition of each embodiment and comparative example

| No. | Type of the first negative electrode material | The mass percentage of the first negative electrode active material w (with respect to the sum of the first and second materials) | Average particle diameter Dv50 of the first negative electrode active material (μm) | Type of the second negative active material | Average particle diameter Dv50 of the second negative electrode active material (μm) | The mass percentage of the negative electrode active material in the negative electrode film | Total average particle diameter Dv50 of the negative electrode active material (μm) | Negative binder | Percentage of the negative binder in the negative electrode film | Negative conductive agent | Percentage of the negative conductive agent in the negative electrode | Type of a carbon nanotube type and aspect ratio | Percentage of CNT in the negative electrode film |
|---|---|---|---|---|---|---|---|---|---|---|---|---|---|
| Embodiment 1 | SiO | 25% | 7.6 | Artificial graphite | 13.5 | 94.5% | 11.4 | Sodium polyacrylate | 4% | Acetylene Black | 1% | SWCNT; 5000:1 | 0.5% |
| Embodiment 2 | SiO | 25% | 7.1 | Artificial graphite | 15.6 | 94.5% | 12.8 | Sodium polyacrylate | 4% | Acetylene Black | 1% | SWCNT; 5000:1 | 0.5% |
| Embodiment 3 | SiO | 25% | 6.8 | Artificial graphite | 16.9 | 94.5% | 13.7 | Sodium polyacrylate | 4% | Acetylene Black | 1% | SWCNT; 5000:1 | 0.5% |
| Embodiment 4 | SiO | 25% | 5.2 | Artificial graphite | 17.8 | 94.5% | 13.9 | Sodium polyacrylate | 4% | Acetylene Black | 1% | SWCNT; 5000:1 | 0.5% |
| Embodiment 5 | SiO | 25% | 7.1 | Artificial graphite | 15.6 | 94.5% | 12.8 | Sodium polyacrylate | 4% | Acetylene Black | 1% | SWCNT; 2800:1 | 0.5% |
| Embodiment 6 | SiO | 25% | 7.1 | Artificial graphite | 15.6 | 94.5% | 12.8 | Sodium polyacrylate | 4% | Acetylene Black | 1% | SWCNT; 3000:1 | 0.5% |
| Embodiment 7 | SiO | 25% | 7.1 | Artificial graphite | 15.6 | 94.5% | 12.8 | Sodium polyacrylate | 4% | Acetylene Black | 1% | SWCNT; 7000:1 | 0.5% |
| Embodiment 8 | SiO | 25% | 7.1 | Artificial graphite | 15.6 | 94.5% | 12.8 | Sodium polyacrylate | 4% | Acetylene Black | 1% | SWCNT; 10000:1 | 0.5% |
| Embodiment 9 | SiO | 25% | 7.1 | Artificial graphite | 15.6 | 94.5% | 12.8 | Sodium polyacrylate | 4% | Acetylene Black | 1% | SWCNT; 15000:1 | 0.5% |
| Embodiment 10 | SiO | 25% | 7.1 | Artificial graphite | 15.6 | 94.5% | 12.8 | Sodium polyacrylate | 4% | Acetylene Black | 1% | SWCNT; 20000:1 | 0.5% |
| Embodiment 11 | SiO | 25% | 7.1 | Artificial graphite | 15.6 | 94.5% | 12.8 | Sodium polyacrylate | 4% | Acetylene Black | 1% | SWCNT; 5000:1 | 0.5% |
| Embodiment 12 | SiO | 25% | 7.1 | Artificial graphite | 15.6 | 94.5% | 12.8 | SBR | 4% | Acetylene Black | 1% | SWCNT; 5000:1 | 0.5% |
| Embodiment 13 | SiO | 15% | 7.1 | Artificial graphite | 15.6 | 95.5% | 13.6 | Sodium polyacrylate | 3% | Acetylene Black | 1% | SWCNT; 5000:1 | 0.5% |
| Embodiment 14 | SiO | 20% | 7.1 | Artificial graphite | 15.6 | 95.0% | 13.2 | Sodium polyacrylate | 3.5% | Acetylene Black | 1% | SWCNT; 5000:1 | 0.5% |
| Embodiment 15 | SiO | 30% | 7.1 | Artificial graphite | 15.6 | 93.5% | 12.4 | Sodium polyacrylate | 5% | Acetylene Black | 1% | SWCNT; 5000:1 | 0.5% |
| Embodiment 16 | SiO | 40% | 7.1 | Artificial graphite | 15.6 | 92.5% | 11.6 | Sodium polyacrylate | 6% | Acetylene Black | 1% | SWCNT; 5000:1 | 0.5% |
| Comparative Example 1 | SiO | 25% | 4.2 | Artificial graphite | 8.5 | 94.5% | 7.1 | Sodium polyacrylate | 4% | Acetylene Black | 1% | SWCNT; 5000:1 | 0.5% |
| Comparative Example 2 | SiO | 25% | 10.5 | Artificial graphite | 20.4 | 94.5% | 17 | Sodium polyacrylate | 4% | Acetylene Black | 1% | SWCNT; 5000:1 | 0.5% |

TABLE 1-continued

The battery composition of each embodiment and comparative example

| No. | Type of the first negative electrode active material | The mass percentage of the first negative electrode active material w (with respect to the sum of the first and second materials) | Average particle diameter Dv50 of the first negative electrode active material (μm) | Type of the second negative active electrode active material | Average particle diameter Dv50 of the second negative electrode active material (μm) | The mass percentage of the negative electrode active material in the negative electrode active material film | Total average particle diameter Dv50 of the negative electrode active material (μm) | Negative binder | Percentage of the negative binder in the negative electrode film | Negative conductive agent | Percentage of the negative conductive agent in the negative electrode | Type of a carbon nanotube type and aspect ratio | Percentage of CNT in the negative electrode film |
|---|---|---|---|---|---|---|---|---|---|---|---|---|---|
| Comparative Example 3 | SiO | 25% | 7.1 | Artificial graphite | 15.6 | 94.5% | 12.8 | Sodium polyacrylate | 4% | Acetylene Black | 1.5% | / | 0.0% |
| Comparative Example 4 | SiO | 25% | 7.1 | Artificial graphite | 15.6 | 94.5% | 12.8 | Sodium polyacrylate | 4% | Acetylene Black | 1% | SWCNT; 1000:1 | 0.5% |

TABLE 2

Test results of embodiments and comparative examples

| No. | Adhesion of the negative electrode plate (N/m) | Cycle performance (cycle) | Battery energy density (wh/kg) | Kinetic performance (Capacity retention rate) |
|---|---|---|---|---|
| Embodiment 1 | 38.5 | 826 | 261 | 83% |
| Embodiment 2 | 37.9 | 815 | 260 | 85% |
| Embodiment 3 | 37.6 | 812 | 262 | 84% |
| Embodiment 4 | 37.2 | 806 | 260 | 83% |
| Embodiment 5 | 36.5 | 795 | 260 | 82% |
| Embodiment 6 | 37.2 | 808 | 260 | 83% |
| Embodiment 7 | 38.6 | 827 | 260 | 87% |
| Embodiment 8 | 40.1 | 840 | 260 | 89% |
| Embodiment 9 | 41.2 | 848 | 260 | 91% |
| Embodiment 10 | 43.5 | 853 | 260 | 92% |
| Embodiment 11 | 35.5 | 780 | 260 | 82% |
| Embodiment 12 | 25.5 | 730 | 258 | 80% |
| Embodiment 13 | 28.5 | 858 | 253 | 86% |
| Embodiment 14 | 30.9 | 826 | 257 | 85% |
| Embodiment 15 | 41.0 | 804 | 263 | 83% |
| Embodiment 16 | 45.2 | 789 | 269 | 81% |
| Comparative Example 1 | 39.6 | 650 | 252 | 78% |
| Comparative Example 2 | 35.5 | 680 | 250 | 75% |
| Comparative Example 3 | 28.7 | 696 | 260 | 79% |
| Comparative Example 4 | 31.6 | 720 | 260 | 81% |

First of all, through the comparison of Comparative Example 3 and Embodiments 5-10, it can be seen that in the lithium-ion secondary battery using a mixture of SiOx (0<x<2) and graphite as the negative electrode active material, some carbon nanotubes introduced to replace conventional conductive agents can significantly improve the cycle performance and kinetic performance of the battery. Therefore, the use of carbon nanotubes can offset some of the negative effects caused by the volume expansion of silicon materials during charging. At the same time, the data on the adhesion of the negative electrode plate shows that the introduction of carbon nanotubes improves the adhesion of the negative electrode plate with the same content of the binder.

Besides, through the comparison of Comparative Examples 3 and 4 and Embodiments 5-10, it can be further seen that in order to make full use of carbon nanotubes, the aspect ratio of carbon nanotubes should be relatively high. When the aspect ratio of carbon nanotubes is relatively small (Comparative Example 4), although the cycle performance and kinetic performance of the battery have been improved to some extent, the improvement is small; and when the aspect ratio is larger than or equal to 2500:1, the improvement in both the adhesion of the negative electrode plate and battery performance has unexpectedly and significantly increased.

In addition, through the comparison of Comparative Examples 1 and 2 and Embodiments 1-4, it can be seen that when carbon nanotubes with the same specification and content are introduced into the negative electrode film, the average particle diameter of the negative electrode active material has a significant impact on the battery performance. When the Dv50 of the negative electrode active material is too small (Comparative example 1) or too large (Comparative example 2), both the cycle performance and kinetic performance of the battery are poor. Only when the average particle diameter Dv50 of the negative electrode active material is in a range of from 8 μm to 14 μm, the battery can be ensured with excellent cycle performance and kinetic performance.

The data of Embodiments 11-16 shows that with the increase of the addition of the amount of negative binder, the adhesion of the negative electrode plate also increases; however, the adhesion of polyacrylate binders (polyacrylamide, sodium polyacrylate, etc.) is stronger compared to conventional binders such as SBR; in particular, sodium polyacrylate works best and can achieve very good cell cycling and kinetic performance at lower addition levels.

Although the present application is already described with reference to the optional embodiments, various improvements may be made to the present application and the components therein may be replaced with equivalents without departing from the scope of the present application. In particular, as long as there is no structural conflict, various technical features mentioned in the various embodiments may be combined in any manner. The present application is not limited to the specific embodiments disclosed herein, and comprises all technical solutions falling within the scope of the claims.

What is claimed is:

1. A secondary battery, comprising a negative electrode plate, wherein the negative electrode plate comprises a negative electrode current collector and a negative electrode film disposed on at least one surface of the negative electrode current collector, and the negative electrode film comprises a negative electrode active material, a conductive agent and a binder,
    the negative electrode active material comprises particles comprising particles of SiOx (0<x<2) and particles of graphite, wherein the particles of SiOx and the particles of graphite are physically mixed together;
    the average particle diameter Dv50 of the particles of SiOx is from 5 μm to 8 μm;
    the average particle diameter Dv50 of the particles of graphite is from 10 μm to 20 μm;
    the average particle diameter Dv50 of the particles of the negative electrode active material is from 8 μm to 14 μm;
    and the conductive agent comprises carbon nanotubes whose aspect ratio is greater than (3000:1) and less than or equal to (20000:1).

2. The secondary battery according to claim 1, wherein the carbon nanotubes are single-walled carbon nanotubes (SWCNTs).

3. The secondary battery according to claim 1, wherein a mass proportion of the carbon nanotubes in the negative electrode film is 0.3% to 1%.

4. The secondary battery according to claim 1, wherein the binder comprises polyacrylate.

5. The secondary battery according to claim 1, wherein a weight content of the binder in the negative electrode film is from 3% to 9%.

6. The secondary battery according to claim 1, wherein a mass percentage content W of the SiOx (0<x<2) in the negative electrode active material is $15\% \leq W \leq 40\%$.

7. The secondary battery according to claim 1, wherein the graphite comprises artificial graphite.

8. The secondary battery according to claim 1, wherein a thickness of the negative electrode current collector is from 4 μm to 10 μm.

9. The secondary battery according to claim 1, wherein a range of surface roughness Ra of the negative electrode current collector is $1.6\ \mu m \leq Ra \leq 3.2\ \mu m$.

10. The secondary battery according to claim 1, wherein an adhesion F between the negative electrode film and the negative electrode current collector is $10\ N/m \leq F \leq 90\ N/m$.

11. The secondary battery according to claim 1, wherein a thickness of the negative electrode current collector is from 4 μm to 10 μm;
    a range of surface roughness Ra of the negative electrode current collector is $1.6\ \mu m \leq Ra \leq 3.2\ \mu m$;
    and an adhesion F between the negative electrode film and the negative electrode current collector is $10\ N/m \leq F \leq 90\ N/m$.

12. The secondary battery according to claim 1, wherein a compacted density PD of the negative electrode film is $1.6\ g/cm^3 \leq PD \leq 2.0\ g/cm^3$.

13. The secondary battery according to claim 1, wherein a coating weight CW of the negative electrode film is $0.045\ mg/mm^2 \leq CW \leq 0.09\ mg/mm^2$.

14. The secondary battery according to claim 1, wherein the secondary battery comprises a positive electrode plate, the positive electrode plate comprises a positive electrode current collector and a positive electrode film disposed on at least one surface of the positive electrode current collector and comprising a positive electrode active material, the positive electrode active material comprises $Li_{1+y}Ni_aCo_bM_cO_{2-z}A_z$, wherein $-0.2 \leq y \leq 0.2$, $0.5 \leq a < 1$, $0 < b \leq 0.3$, $0 < c \leq 0.2$, $0 \leq z < 0.2$, and M is selected from the group consisting of one or more of Mn and Al, and A is selected from the group consisting of one or more of S, N, F, Cl, Br and I.

15. The secondary battery according to claim 1, wherein the carbon nanotubes whose aspect ratio is greater than (2800:1) and less than or equal to (10000:1).

16. The secondary battery according to claim 1, wherein an adhesion F between the negative electrode film and the negative electrode current collector is $30\ N/m \leq F \leq 80\ N/m$.

17. The secondary battery according to claim 16, wherein an adhesion F between the negative electrode film and the negative electrode current collector is $30\ N/m \leq F \leq 50\ N/m$.

18. A battery module, comprising:
    a secondary battery, comprising a negative electrode plate, wherein the negative electrode plate comprises a negative electrode current collector and a negative electrode film disposed on at least one surface of the negative electrode current collector, and the negative electrode film comprises a negative electrode active material, a conductive agent and a binder, the negative electrode active material comprises particles comprising particles of SiOx (0<x<2) and particles of graphite, wherein the particles of SiOx and the particles of graphite are physically mixed together;

the average particle diameter Dv50 of the particles of SiOx is from 5 μm to 8 μm;

the average particle diameter Dv50 of the particles of graphite is from 10 μm to 20 μm;

the average particle diameter Dv50 of the particles of the negative electrode active material is from 8 μm to 14 μm;

and the conductive agent comprises carbon nanotubes whose aspect ratio is greater than (3000:1) and less than or equal to (20000:1).

19. An apparatus, comprising:

a secondary battery, comprising a negative electrode plate, wherein the negative electrode plate comprises a negative electrode current collector and a negative electrode film disposed on at least one surface of the negative electrode current collector, and the negative electrode film comprises a negative electrode active material, a conductive agent and a binder, the negative electrode active material comprises particles comprising particles of SiOx (0<x<2) and particles of graphite, wherein the particles of SiOx and the particles of graphite are physically mixed together;

the average particle diameter Dv50 of the particles of SiOx is from 5 μm to 8 μm;

the average particle diameter Dv50 of the particles of graphite is from 10 μm to 20 μm;

the average particle diameter Dv50 of the particles of the negative electrode active material is from 8 μm to 14 μm;

and the conductive agent comprises carbon nanotubes whose aspect ratio is greater than (3000:1) and less than or equal to (20000:1).

* * * * *